United States Patent
Dobruia et al.

(10) Patent No.: US 8,950,782 B2
(45) Date of Patent: Feb. 10, 2015

(54) MOUNTING DEVICE FOR SECURING A SEAT BELT BUCKLE

(71) Applicant: Faurecia Autositze GmbH, Stadthagen (DE)

(72) Inventors: Mihai Dobruia, Gröbenzell (DE); André Picker, Hespe (DE); Alexander Markhof, Stadthagen (DE)

(73) Assignee: Faurecia Autositze GmbH, Stadthagen (DE)

( * ) Notice: Subject to any disclaimer, the term of this patent is extended or adjusted under 35 U.S.C. 154(b) by 0 days.

(21) Appl. No.: 13/902,125

(22) Filed: May 24, 2013

(65) Prior Publication Data

US 2014/0151992 A1    Jun. 5, 2014

(30) Foreign Application Priority Data

May 24, 2012   (DE) .......................... 10 2012 010 230

(51) Int. Cl.
   *B60R 22/18*   (2006.01)
   *B60R 22/26*   (2006.01)
   *B60R 22/20*   (2006.01)

(52) U.S. Cl.
   CPC ................ *B60R 22/26* (2013.01); *B60R 22/18* (2013.01); *B60R 22/20* (2013.01); *B60R 2022/1806* (2013.01)
   USPC ...................................... 280/808; 280/801.1

(58) Field of Classification Search
   CPC .......................... B60R 22/26; B60R 2022/1806
   USPC ............................................... 280/801.1, 808
   See application file for complete search history.

(56) References Cited

U.S. PATENT DOCUMENTS

| | | | | |
|---|---|---|---|---|
| 4,645,232 A * | 2/1987 | Hamada et al. | ............ | 280/801.1 |
| 4,697,827 A * | 10/1987 | Sasaki et al. | .................. | 280/808 |
| 6,015,164 A * | 1/2000 | Yano | .............................. | 280/806 |
| 6,581,969 B2 * | 6/2003 | Nishide | ....................... | 280/801.1 |
| 7,497,474 B2 * | 3/2009 | Sanchez et al. | ............ | 280/801.1 |

(Continued)

FOREIGN PATENT DOCUMENTS

| | | | | |
|---|---|---|---|---|
| DE | 10242603 A1 * | 4/2004 | .............. | B60R 22/26 |
| DE | 10 2006 043 1 | 3/2008 | | |

(Continued)

OTHER PUBLICATIONS

German Office Action dated Feb. 26, 2013 of DE 10 2012 010 230.5, filed May 24, 2012. (4 pages).

*Primary Examiner* — Nicole Verley
(74) *Attorney, Agent, or Firm* — Shlesinger, Arkwright & Garvey LLP

(57) ABSTRACT

Mounting device for securing a seat belt buckle to a seat frame of a vehicle seat has a fitting which is connectable to the seat belt buckle via a connecting element, and a mounting element which is connected to the seat frame. The fitting is supported on the mounting element in a rotatably articulated manner. A spring element having a locking element is provided which is fastened to the mounting device in a rotation-free manner. By rotating the fitting on the mounting element from a mounting position into a use position, a cutout in the fitting overlaps with a cutout in the mounting element, and the locking element locks with both cutouts at the same time, thus fixing the fitting, prevented from rotating, on the mounting element.

14 Claims, 6 Drawing Sheets

(56) References Cited

U.S. PATENT DOCUMENTS

| | | | |
|---|---|---|---|
| 7,527,296 B2 * | 5/2009 | Kojima et al. | 280/801.1 |
| 7,530,600 B2 * | 5/2009 | Di Grande | 280/801.1 |
| 7,537,242 B2 * | 5/2009 | Fujii et al. | 280/804 |
| 7,625,010 B2 * | 12/2009 | Fujii et al. | 280/801.1 |
| 2006/0231317 A1 * | 10/2006 | Yamaguchi et al. | 180/268 |
| 2007/0132224 A1 * | 6/2007 | Hall | 280/801.1 |
| 2011/0243653 A1 * | 10/2011 | Buckingham et al. | 403/322.4 |
| 2014/0021710 A1 * | 1/2014 | Rao et al. | 280/806 |

FOREIGN PATENT DOCUMENTS

| | | | | |
|---|---|---|---|---|
| DE | 102006059096 A1 * | 6/2008 | | B60R 22/22 |
| DE | 102011086836 * | 5/2013 | | B60R 22/18 |
| EP | 1932732 A3 * | 5/2009 | | |
| EP | 2 216 214 | 8/2010 | | |
| FR | 2882312 A1 * | 8/2006 | | B60R 22/18 |
| FR | 2882981 A1 * | 9/2006 | | |
| FR | 2 945 500 | 11/2010 | | |
| FR | 2987013 * | 2/2012 | | B60R 22/18 |

* cited by examiner

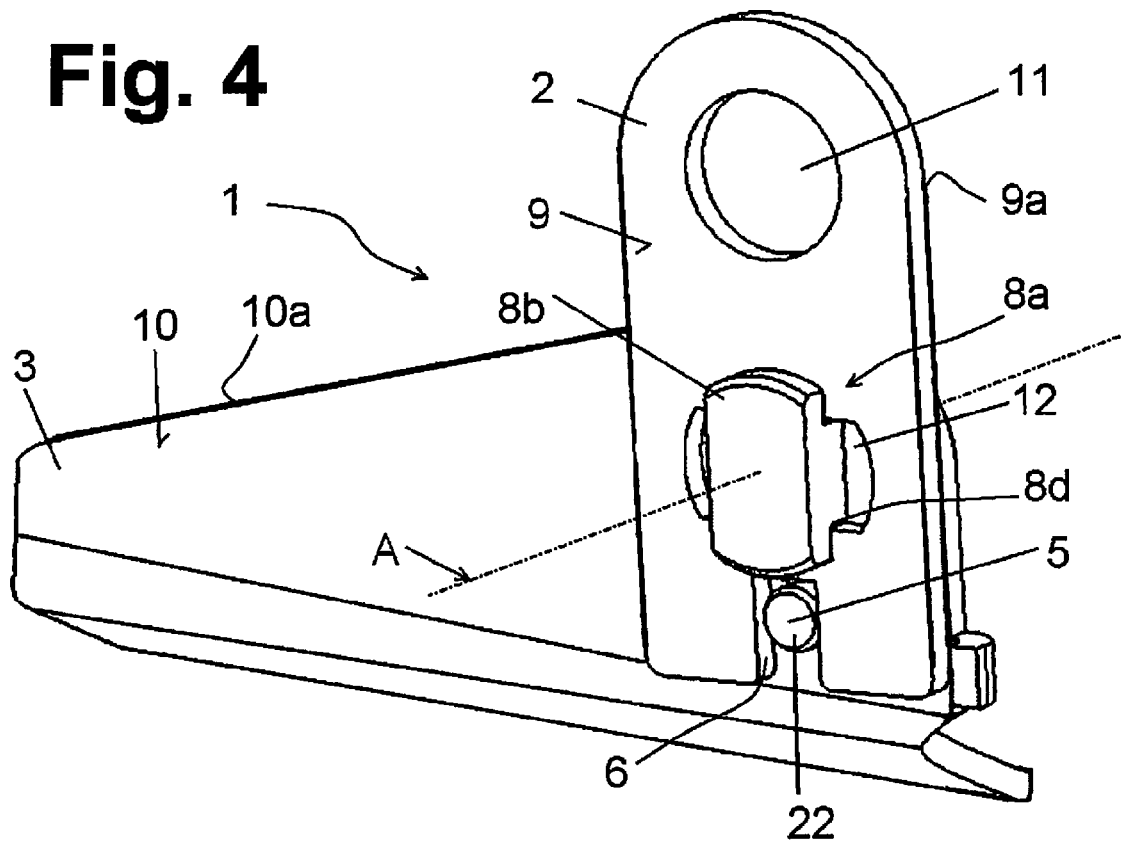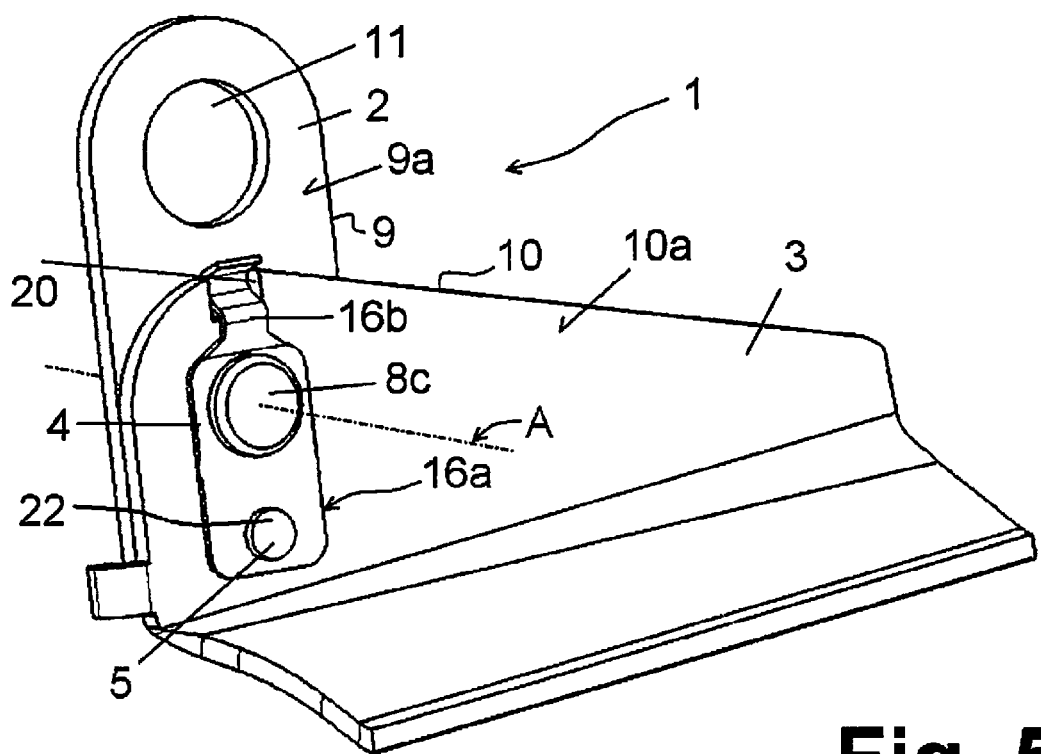

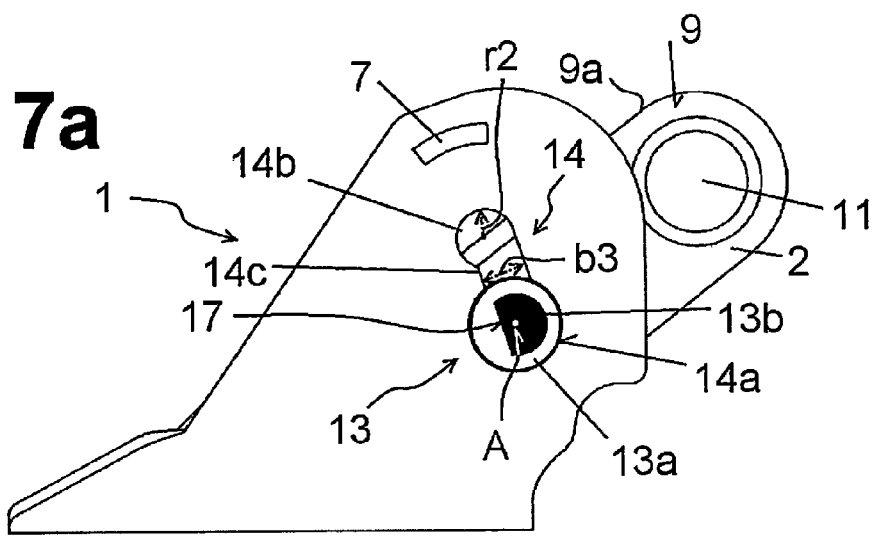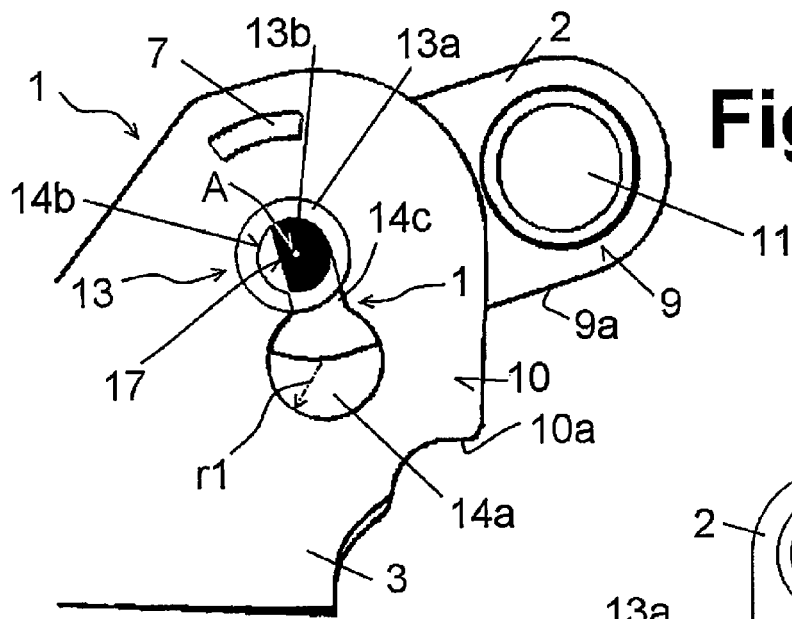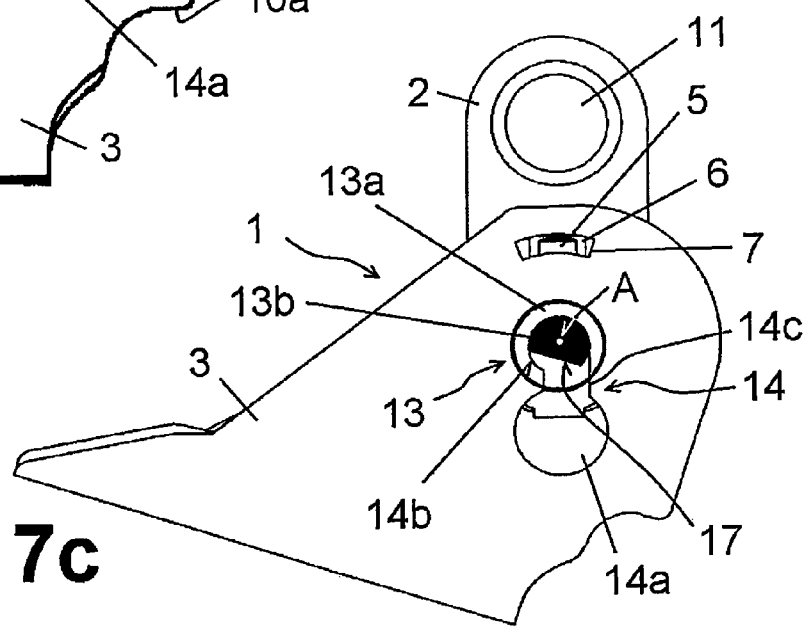

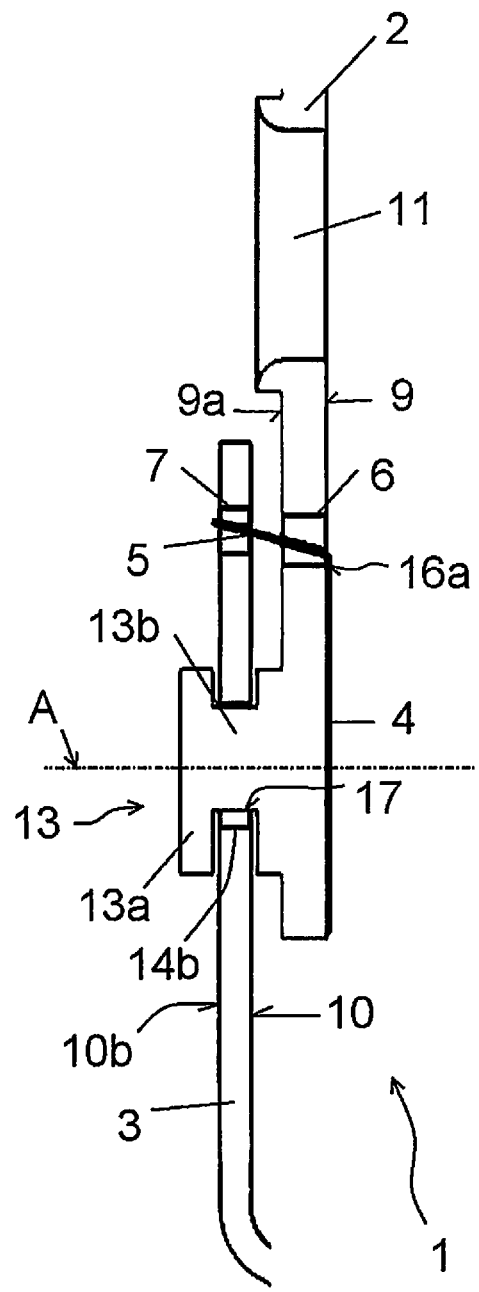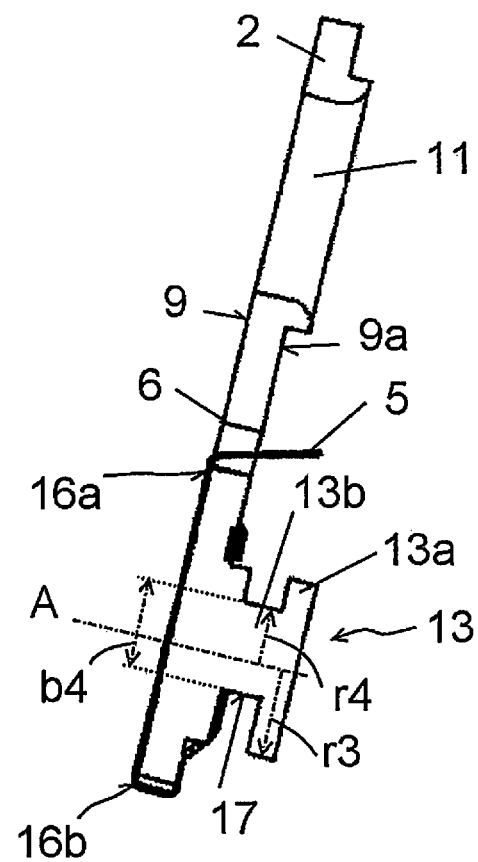
Fig. 8a
Fig. 8b

MOUNTING DEVICE FOR SECURING A SEAT BELT BUCKLE

CROSS-REFERENCE TO RELATED APPLICATIONS

This application claims the priority of German patent application no. 10 2012 010 230.5, filed May 24, 2012, and which is incorporated herein by reference.

FIELD OF THE INVENTION

The present invention relates to a mounting device for securing a seat belt buckle to a seat frame of a vehicle seat.

BACKGROUND OF THE INVENTION

These types of mounting devices are known for affixing a seat belt buckle to a seat frame of a vehicle seat via a rod, for example. For this purpose, a fitting is provided which is mounted on an element of the seat frame which is fixed to the seat part, the fitting being secured against rotation. As a result, the seat belt buckle, which is connected to the fitting via the rod, always remains in a certain angular position, so that locking a vehicle seat belt into the seat belt buckle is simplified for a driver of a vehicle.

These types of mounting devices having a fitting are usually situated on the side of the seat frame of the vehicle seat. The fitting is screwed to a mounting element by means of a screw, the mounting element being affixed, for example, to a rail of the seat frame. As a result, the seat belt buckle is mounted in a fixed position relative to the seat frame.

This type of mounting device is disclosed in EP 2 216 214 A1, for example, which provides that the seat belt buckle is connected to the fitting via a rod, the fitting being screwed to a mounting which is fixed to the seat part by means of a screw. In addition, lugs are provided on the fitting, one of the lugs engaging in a groove in the mounting which is fixed to the seat part, thus preventing rotation of the fitting. Additional lugs are intended to ensure that the fitting is installed with the correct side face on the mounting.

In German Offenlegungsschrift (Laid Open published Patent Application) DE 10 2006 043 161 A1 it is provided to mount the fitting on a slider, the slider being guided in a guide rail which is fixed to the vehicle, and the slider being carried along when the vehicle seat moves. The fitting and the seat belt buckle affixed thereto are also carried along, so that the seat belt buckle is always situated at a fixed distance relative to the driver, even when the vehicle seat is moved forward or backward on the rail. The fitting is affixed to the slider either directly, or via the coupling device by means of a screw.

A disadvantage of these approaches is that the fitting which holds the seat belt buckle is very difficult to mount on the seat frame. In particular during mounting, which often takes place only after the vehicle seat is installed, affixing is made difficult due to a screw, for example, since the space in the vehicle is then very limited, making it difficult to reach the screw with the appropriate tool. As a result, the installation time and effort are significantly increased. Furthermore, additional costs are incurred due to the required screwing means.

Moreover, additional elements are necessary on the fitting to ensure that the fitting is affixed to the mounting on the correct side face, which lengthens the manufacturing process for the fitting.

Another mounting device of this type is described in FR 2 945 500 A1, which provides for fixing a fitting, which is connectable to a seat belt buckle, to a mounting means in a rotation-free manner. The fitting has two clips, and the mounting means has two recesses into which the clips may be inserted, the recesses having a bayonette-like design. When the fitting undergoes torsion, the inserted clips twist in the recesses in such a way that they jam in the use position, thus securing the fitting against further rotation.

OBJECTS AND SUMMARY OF THE INVENTION

An object of the invention is to overcome the drawbacks of the prior art.

An object of the invention, therefore, is to provide a mounting device which allows the seat belt buckle to be easily and securely attached to a seat frame of a vehicle seat.

This object is achieved by a mounting device according to the invention as described herein.

Thus, for a mounting device according to the invention, simple and secure mounting of a seat belt buckle is achieved in that a fitting which is connectable to the seat belt buckle via a connecting element is supported e.g. mounted on a mounting element which is fixed to the seat part in a rotationally e.g., rotatably articulated manner. In this regard, "supported in a rotatably articulated manner" means that the fitting is rotatable, relative to the mounting element which is fixed to the seat part, about a fixed rotational axis that is substantially perpendicular to a surface of the mounting element. The rotational axis may be defined by a bearing pin or a rivet, for example.

It is further provided that the supported fitting, after a rotation from a mounting position, is fixed in a defined relative position on the mounting element in a rotation-free manner. The fitting is then in a use position, and is fixedly mounted on the mounting element which is fixed to the seat part and secured against further rotation.

For this purpose, according to the invention at least one spring element is provided, which is situated on the mounting device in a rotation-free manner and preferably has a first and a second spring arm. In addition, cutouts are situated on the mounting element and on the fitting. According to the invention, a locking element which is affixed to the first spring arm of the spring element may be locked into these cutouts. In the use position, both cutouts are in flush alignment one above the other in a direction parallel to the rotational axis, so that the locking element may be pressed into both cutouts at the same time due to the restoring force of the spring.

The spring element is affixed on a surface of the fitting or of the mounting element. For the case that the spring element is situated on the surface of the mounting element, a rivet is provided as a bearing of the fitting, it being possible, for example, for the rivet to wobble on the mounting element. The spring element may be additionally affixed to the mounting element by means of the rivet, which is guided through the mounting element.

For the case that the spring element is affixed to the surface of the fitting, the rotatable bearing of the fitting on the mounting element is likewise secured by either a rivet or by a bearing pin on the fitting, the bearing pin being supported in a bearing element in the mounting element in a rotationally articulated manner. The bearing element is composed of multiple holes.

According to the invention, the fitting is thus supported on the mounting element in a rotatably articulated manner, and is rotatable until the locking element on the spring element locks into both cutouts. As a result of the locking, the seat belt buckle, which is secured to the fitting via a connecting element, is held in a fixed position relative to the seat frame.

This results in several advantages. On the one hand, the mounting is easier, since the fitting may simply be placed on and affixed to the mounting element, even after the vehicle seat is installed. In addition, no screw connection is necessary for the mounting of the fitting in a rotatably articulated manner, so that an additional tool is not required, and the affixing does not have to be carried out from an awkward position. This significantly reduces the level of effort for mounting, and even one-handed mounting is conceivable.

Relative terms such as left, right, up, and down are for convenience only and are not intended to be limiting.

The invention is explained in greater detail below based on several embodiments with reference to the appended drawings, which show the following:

BRIEF DESCRIPTION OF THE DRAWINGS

FIG. 4 shows a mounting device in the use position according to a second embodiment, in a perspective front view;

FIG. 5 shows a mounting device in the use position according to a second embodiment, in a perspective rear view;

FIG. 7a shows the mounting device according to the third embodiment in an initial step of installation on a mounting element, in a side view;

FIG. 7b shows the mounting device according to the third embodiment in a further step of installation on a mounting element, in a side view;

FIG. 7c shows the mounting device according to the third embodiment in a still further step of installation on a mounting element, in a side view;

FIG. 8a shows a section of the mounting device according to the third embodiment;

FIG. 8b shows a section of a fitting of the mounting device according to the third embodiment;

DETAILED DESCRIPTION OF THE INVENTION

The embodiments relate to a mounting device 1 for securing, e.g., attaching a seat belt buckle, not illustrated, to a seat frame 15 of a vehicle seat 21. The seat frame 15 and the vehicle seat 21 are illustrated in the corresponding figures merely in outline; i.e., schematically. The mounting device 1 is situated at the side of the vehicle seat 21 in such a way that the seat belt buckle thus attached may be positioned so that a driver of a vehicle may easily insert a seat belt, as generally known, into the seat belt buckle, and thus be secured, for example in the event of a collision of the vehicle.

Figure 1:
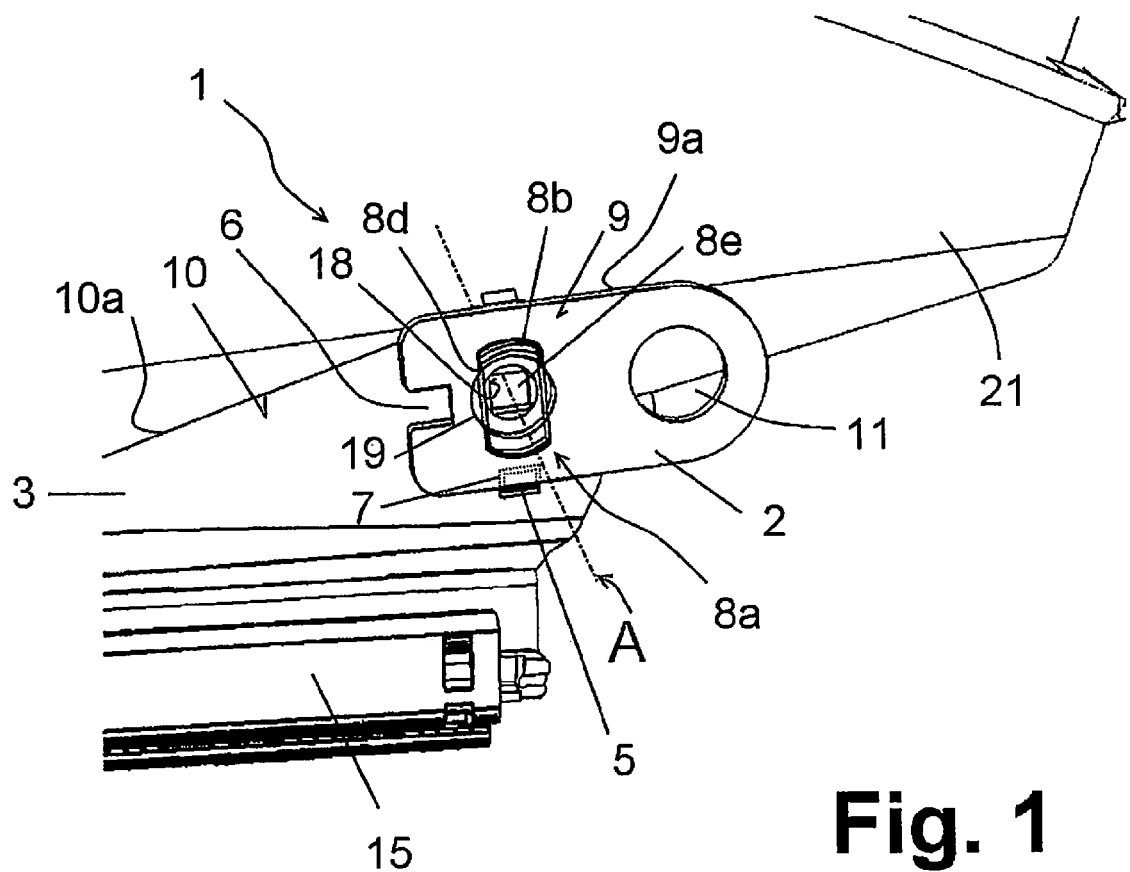
FIG. 1 shows a mounting device in a first embodiment of the invention on a seat frame of a vehicle seat, in a mounted position.

As shown in FIG. 1, it is provided that a mounting element 3 is situated on the seat frame 15. The seat frame 15 may be a rail in which the vehicle seat 21 is guided, but may also be any other given frame of the vehicle seat 21 which is fixed to the seat part. A fitting 2 is supported on the mounting element 3 in a rotatably articulated manner. The seat belt buckle is mounted on a connecting hole 11 of the fitting 2 via a connecting element, not shown.

Figure 2:
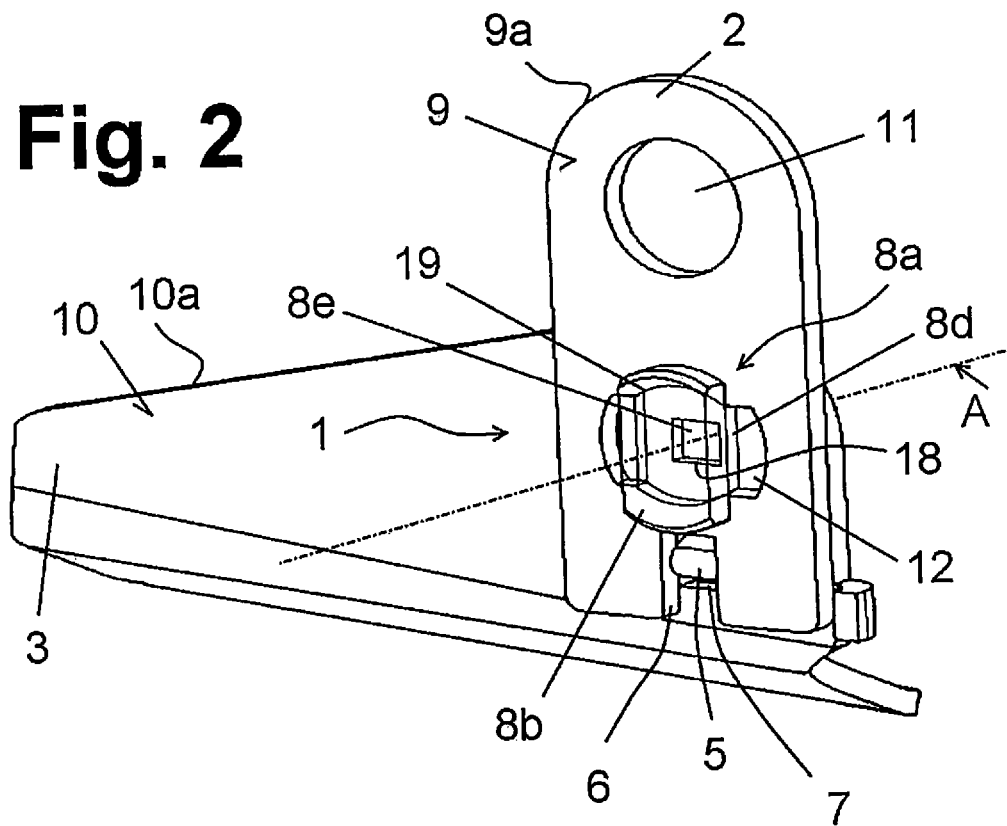
FIG. 2 shows the mounting device according to FIG. 1 in a use position in a perspective front view.
Figure 3:
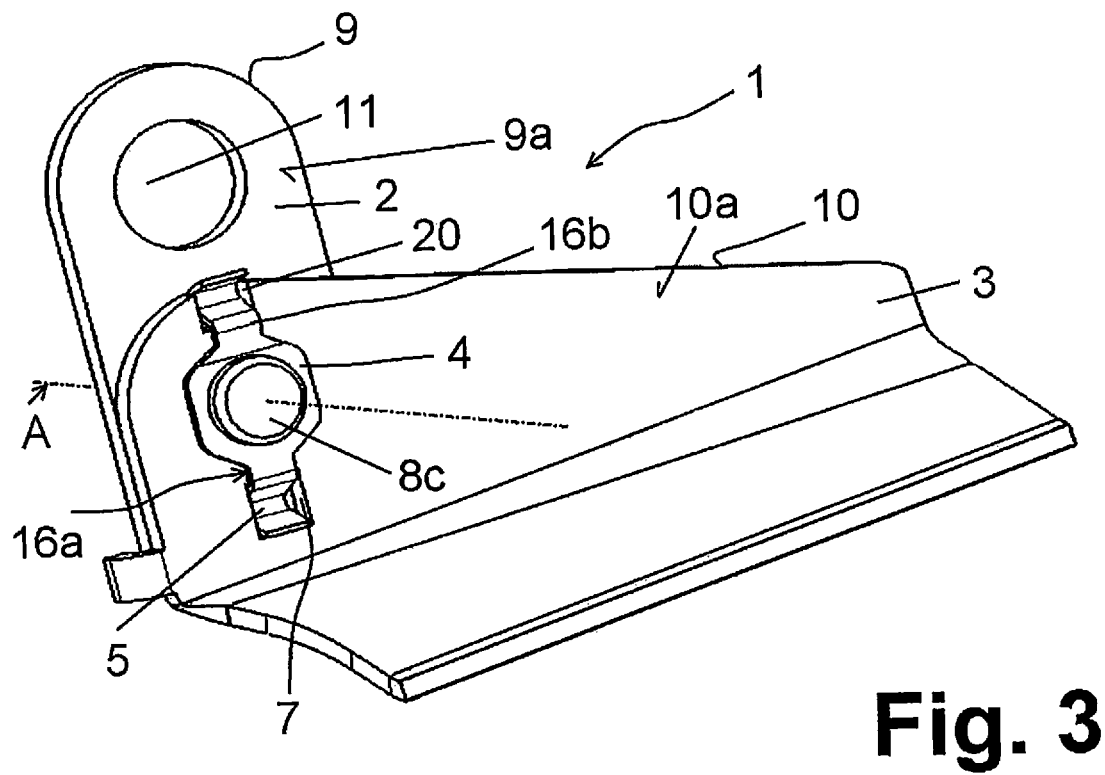
FIG. 3 shows the mounting device according to FIG. 1 in a use position in a perspective rear view.
Figure 6:
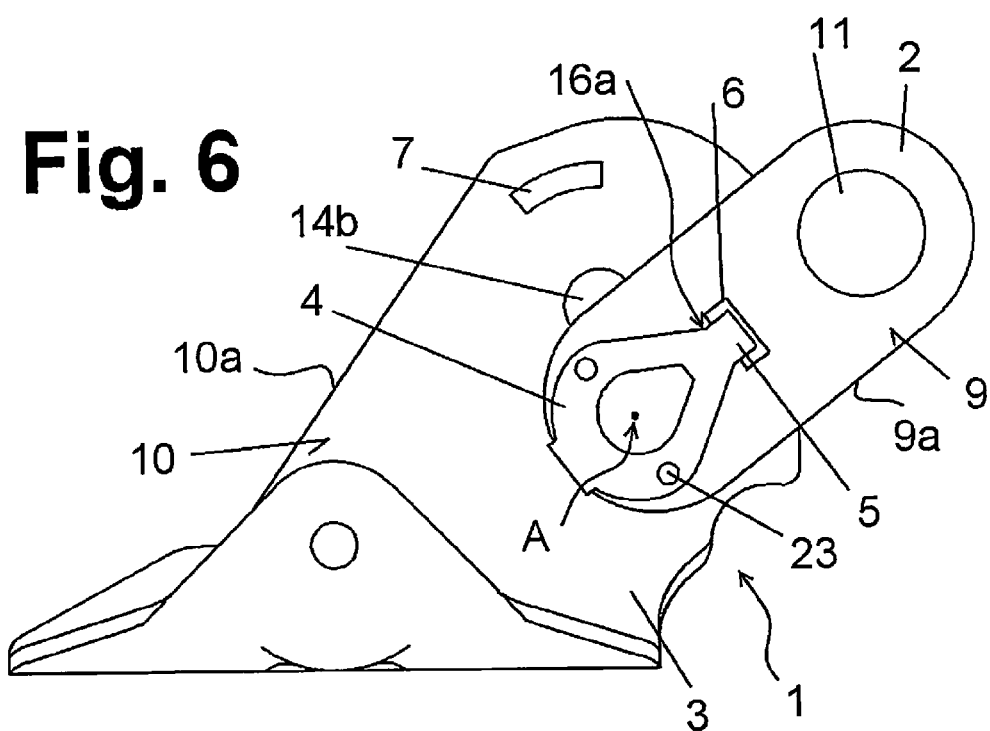
FIG. 6 shows a mounting device according to a third embodiment, in a front view.

According to the embodiment in FIGS. 1 through 3, the fitting 2 is supported on the mounting element 3 by means of a rivet 8a so as to be rotatable about a rotational axis A. The rivet 8a is affixed to the mounting element 3 in a rotation-free manner, the square rivet shank 8e protruding through a square hole 18 in the mounting element 3. Rotation of the rivet 8a is thus prevented, since the rivet shank 8e as well as the hole 18 are square and fit exactly inside one another. By means of a riveting or wobbling process, the rivet shank 8e is deformed into a closing head 8c (see FIG. 3) at a surface 10a of the mounting element 3 opposite from the fitting 2, thus fixing the rivet 8a on the mounting element 3.

The rivet 8a also has a rivet head 8b whose external profile essentially corresponds to the shape of an opening 12 (see FIG. 2) in the fitting 2. Via the opening 12, the fitting 2 is thus placeable with a precise fit on the rivet head 8b in a certain relative rotation. In addition, the rivet head 8b is shaped in such a way that it is narrowed in diameter in a rivet head area 8d on its side facing a surface 10 of the mounting element 3. The narrowed rivet head area 8d has essentially a circular shape with the midpoint on the rotational axis A, the circle being symmetrically flattened on two opposite sides. The diameter described by the rivet head area 8d is greater than the diameter described by the square hole 18.

In addition, according to FIGS. 1 and 2 the opening 12 in the fitting 2 has circular recesses 19 which describe a diameter that approximately corresponds to the diameter described by the rivet head area 8d. The fitting 2 may thus be placed on the rivet head area 8d and supported thereon in a rotationally articulated manner.

According to the embodiment in FIGS. 1 and 2, the fitting 2 is symmetrical with respect to its surface 9, so that the fitting may be placed on either side of the rivet 8a.

As is apparent from FIG. 3, a spring element 4 is situated on the surface 10a of the mounting element 3 facing away from the fitting 2. By means of the closing head 8c the spring element 4 is clamped between the closing head and the mounting element 3, and is thus affixed to the mounting element 3.

A locking element 5 is provided on a first spring arm 16a of the spring element 4, and, as shown in FIG. 3, in this embodiment forms a unit with the spring element 4. The locking element 5 is thus formed by the first spring arm 16a, which on its outer area is bent into a "V" in the direction of the mounting element 3.

Figure 9A:
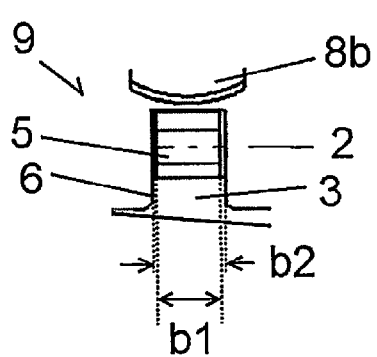
FIG. 9a shows a locking element in cutouts in the mounting device in a perspective front view.
Figure 9B:
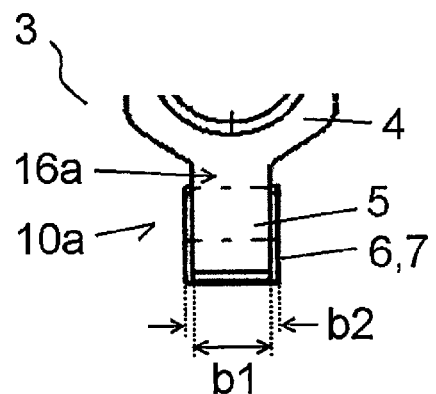
FIG. 9b shows a locking element in cutouts in the mounting device in a perspective rear view.

In addition, a first cutout 6 is provided on the fitting 2, and a second cutout 7 is provided on the mounting element 3. The locking element 5 is lockable into these cutouts 6, 7, in the relative rotation of the fitting 2 (referred to below as the mounting position) shown in FIG. 1 the locking element 5 being locked only into the second cutout 7, and pressing against the surface 9a of the fitting 2 facing the mounting element 3. The cutouts 6, 7 are dimensioned in such a way that a width b1 of the locking element 5 is slightly smaller than a width b2 of the cutouts (see FIGS. 9a, b), so that the locking element 5 is lockable into the cutouts 6, 7 with little play. The locking is ensured by the spring action of the pretensioned spring element 4. The spring element 4, i.e., the first spring arm 16a, does not relax until the locking element 5, as shown in FIGS. 2 and 3, protrudes through both cutouts 6, 7. This is the case when the fitting 2 is twisted about the rotational axis A from its mounting position into a use position.

As is further apparent from FIG. 3, a second spring arm 16b is provided on the spring element 4, on the side opposite from the first spring arm 16a. The second spring arm 16b protrudes through a third cutout 20 in the mounting element 3, and is pressed against the fitting 2 due to the spring action. Vibrations which occur due to slight play between the mounting element 3 and the fitting 2 during operation of the vehicle are thus preventable, and small tolerances may be compensated for in this way. For tolerance compensation, a resilient disk or disk spring, not illustrated here, which abuts against the surface 10 and is held by the rivet 8a may also be provided. That is, the rivet head area facing the surface of the mounting element may be configured to compensate for tolerance in a direction parallel to the rotational axis. When the fitting 2 is attached, a possible tolerance-related interspace between the fitting 2 and the surface 10 may be compensated for.

For attaching the seat belt buckle by means of the mounting device 1 according to the invention, according to the embodiment in FIGS. 1 through 3 the fitting 2 is placed on the rivet 8a, which is fastened to the mounting element 3, and the fitting 2 is twisted in such a way that it is placeable with a precise fit on the rivet head 8b. When the fitting 2 is in the rivet head area 8d, the fitting 2 is rotatably supported and is twisted counterclockwise until the locking element 5 locks into the first cutout 6 in the fitting 2. Since the locking element 5 is locked into both cutouts 6, 7, the fitting 2 is secured against further rotation; e.g., fitting 2 is prevented from rotating, it is secured in a rotation-free manner.

The seat belt buckle may be fastened to the connecting hole 11 via the connecting element either before or after mounting. In particular, mounting after the vehicle seat is installed is also easily possible.

FIGS. 4 and 5 illustrate another embodiment in which in particular the locking element 5 differs from that in FIGS. 1 through 3. On the spring element 4 a pin 22 is provided on the first spring arm 16a, the pin likewise locking into the first and second cutouts 6, 7 due to the elastic force of the spring element 4. The pin 22 may absorb a fairly large force, in particular in the event of an accident, and in the use position the fitting 2 is thus also secured against rotation involving fairly large forces.

According to another embodiment illustrated in FIGS. 6, FIGS. 7a-c, and FIGS. 8a and b, it is provided that the spring element 4 is situated on the surface 9 of the fitting 2. The spring element 4 is fastened to the fitting 2 via a fastening element 23. In addition, the first cutout 6 in the fitting 2 and also the second cutout 7 on the mounting element 3 are designed substantially as rectangular holes. The first spring arm 16a of the spring element 4 forms the locking element 5, which is bent in the area of the first cutout 6 so that it protrudes through the first cutout 6, as shown in FIG. 8b.

A bearing pin 13 having a pin head 13a and a pin shank 13b is provided on the fitting 2 on the surface 9a of the fitting 2 situated opposite from the spring element 4, the pin shank 13b being flattened on one side 17, as illustrated in FIGS. 7a-c. In the present case, the bearing pin 13 is used for supporting the fitting 2 on the mounting element 3 in a rotatably articulated manner. In FIGS. 7a-c, the pin head 13a is illustrated transparently so that the rotation of the pin shank 13b in the various mounting steps is discernible.

For supporting the fitting 2, a bearing element 14 composed of two holes 14a, 14b which are connected by one oblong hole 14c is provided on the mounting element 3. The first hole 14a has a radius r1 which is slightly larger than a radius r3 of the pin head 13a (for the sake of clarity, radii are illustrated only in FIGS. 7a, 7b, and 8b). A radius r2 of the second hole 14b is slightly larger than a radius r4 of the pin shank 13b. The connection between the two holes 14a, 14b in the form of the oblong hole 14c has a width b3 which is slightly larger than the width b4 of the flattened pin shank 13b. As a result, the pin shank 13b fits into the oblong hole 14c only in a certain relative rotation of the bearing pin 13.

For mounting the fitting 2 on the mounting element 3 according to this embodiment, the pin head 13a is initially introduced into the first hole 14a (see FIG. 7a) and subsequently twisted about the rotational axis A in such a way that the flattened side 17 of the pin shank 13b is situated so that the pin shank 13b may be pushed through the oblong hole 14c in the direction of the second head 14b (see FIG. 7a). When the pin shank 13b is in the oblong hole 14c, the fitting cannot be twisted; rotation may occur only due to tolerances between the widths b3 and d4.

When the pin shank 13b is in the second hole 14b, it may be twisted therein due to the dimensioning of the radii r2 and r4 (see FIG. 7b); the fitting 2 is supported in the second hole 14b so as to be rotatable about the rotational axis A in an articulated manner. From the mounting position, the fitting 2 is subsequently twisted until the locking element 5 locks into the second cutout 7 due to the elastic force, as illustrated in FIGS. 7c and 8a. The fitting 2 is thus secured against additional rotation. The pin head 13a prevents the fitting 2 from leaving the second hole 14b.

In all embodiments, the fitting 2 is mountable on either side of the mounting element 3. However, it is preferably provided that the fitting 2 is affixed to the side 10 of the mounting element 3 facing away from the vehicle seat, thus simplifying assembly or disassembly of the seat belt buckle. In principle, it is possible to affix the fitting 2 to the mounting element 3 without an additional level of effort for mounting, even after the vehicle seat is installed.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. Mounting device for attaching a seat belt buckle to a seat frame of a vehicle seat, comprising:
   a) a fitting connectable to the seat belt buckle via a connecting element;
   b) a mounting element which is connected to the seat frame, the fitting being supported on the mounting element, in a rotatably articulated manner, and including a spring element having a locking element which is fastened to the mounting device in a rotation-free manner; and
   c) by rotating the fitting on the mounting element from a mounting position into a use position, a cutout in the fitting overlaps with a cutout in the mounting element, and the locking element locks with both cutouts at the same time and thus fixes the fitting, prevented from rotating, on the mounting element.

2. Mounting device according to claim 1, wherein:
   a) a rivet is provided on the mounting element, and the rivet has a rivet head and a closing head;
   b) the rivet is riveted to the mounting element in a rotatably fixed manner, and a rivet head area which is narrowed in diameter is provided on the rivet head on the side facing a surface of the mounting element in such a way that the fitting is supported in this rivet head area in a rotatably articulated manner; and c) on the side facing away from the surface of the mounting element the rivet head is configured in such a way that removal of the supported fitting from the rivet head area is prevented, at least in the use position.

3. Mounting device according to claim 2, wherein:
a) an opening in the fitting, and an opening in the rivet head, are rectangular, so that the fitting may be placed with a precise fit on the rivet head and placed in the rivet head area and removed only in the mounting position.

4. Mounting device according to claim 2, wherein:
a) the rivet head area facing the surface of the mounting element is configured to compensate for tolerance in a direction parallel to the rotational axis.

5. Mounting device according to one of claim 2, wherein:
a) the spring element is fastened to the surface of the mounting element in a rotation-free manner by the rivet.

6. Mounting device according to one of claim 2, wherein:
a) the spring element is fastened on a surface of the fitting in a rotation-free manner.

7. Mounting device according to claim 1, wherein:
a) the fitting is rotatably supported on the mounting element by a bearing pin provided on the fitting, and the spring element is fastened on the surface of the fitting in a rotation-free manner.

8. Mounting device according to claim 7, wherein:
a) the bearing element has a first hole and a second hole, and one oblong hole, and the bearing pin has a pin head and a pin shank, the pin head being introducible with a precise fit into the first hole, and the pin shank being supported with a precise fit in the second hole, and the pin shank having a smaller diameter than the pin head, so that the fitting which is supported in the second hole is prevented from leaving the second hole.

9. Mounting device according to one of claim 8, wherein:
a) the pin shank has a flattened side, so that the pin shank is displaceable through the oblong hole only in the mounting position of the fitting.

10. Mounting device according to claim 1, wherein:
a) the locking element is a pin.

11. Mounting device according to claim 1, wherein:
a) the locking element is formed by a bend in a first spring arm of the spring element.

12. Mounting device according to claim 1, wherein:
a) the locking element locks into the cutout in the fitting and the cutout in the mounting element due to a restoring force of the spring element.

13. Mounting device according to claim 12, wherein:
a) a second spring arm of the spring element presses against the fitting, so that bearing tolerances of the fitting may be compensated for, and vibrations of the fitting may thus be prevented.

14. Mounting device according to claim 1, wherein:
a) a connecting hole at which the seat belt buckle is secured via the connecting element is provided in the fitting.

\* \* \* \* \*